(12) United States Patent
Polizzotti et al.

(10) Patent No.: US 8,703,904 B2
(45) Date of Patent: Apr. 22, 2014

(54) HYDROGELS AND METHODS FOR PRODUCING AND USING THE SAME

(75) Inventors: Brian Polizzotti, Jamaica Plain, MA (US); Kristi Anseth, Boulder, CO (US); Benjamin Fairbanks, Boulder, CO (US); Cole DeForest, Boulder, CO (US)

(73) Assignee: The Regents of the University of Colorado, Denver, CO (US)

( * ) Notice: Subject to any disclaimer, the term of this patent is extended or adjusted under 35 U.S.C. 154(b) by 430 days.

(21) Appl. No.: 12/678,920

(22) PCT Filed: Sep. 18, 2008

(86) PCT No.: PCT/US2008/076897
§ 371 (c)(1),
(2), (4) Date: Aug. 5, 2010

(87) PCT Pub. No.: WO2009/039307
PCT Pub. Date: Mar. 26, 2009

(65) Prior Publication Data
US 2010/0291357 A1    Nov. 18, 2010

Related U.S. Application Data

(60) Provisional application No. 60/973,716, filed on Sep. 19, 2007.

(51) Int. Cl.
*A61K 38/00*    (2006.01)

(52) U.S. Cl.
USPC ............................................. 530/300

(58) Field of Classification Search
None
See application file for complete search history.

(56) References Cited

U.S. PATENT DOCUMENTS

2006/0110782 A1*    5/2006    Bertozzi et al. ............... 435/18

OTHER PUBLICATIONS

Enhanced green fluorescent protein [EGFP expression vector Ad-EGFP] - Protein—NCBI http://www.ncbi.nlm.nih.gov/protein/AAK15492.1 accessed on Sep. 6, 2012, p. 1.*
Opsteen et al., Chemical Communications, Aug. 14, 2007, No. 30, 3109-3216.*

* cited by examiner

*Primary Examiner* — Marcela M Cordero Garcia
*Assistant Examiner* — Kaipeen Yang
(74) *Attorney, Agent, or Firm* — Don D. Cha; Hamilton DeSanctis & Cha, LLP

(57) ABSTRACT

The present invention relates to hydrogels and methods for producing and using the same. In particular, some embodiments of the invention relate to hydrogels and methods for patterning the same.

4 Claims, 5 Drawing Sheets

HYDROGELS AND METHODS FOR PRODUCING AND USING THE SAME

CROSS-REFERENCE TO RELATED APPLICATIONS

This application claims the priority benefit of U.S. Provisional Application No. 60/973,716, filed Sep. 19, 2007, which is incorporated herein by reference in its entirety.

FIELD OF THE INVENTION

The present invention relates to hydrogels and methods for producing and using the same.

BACKGROUND OF THE INVENTION

The ability to independently tailor the properties of three-dimensional hydrogel-based systems is useful for a variety of applications including, but not limited to, biomedical applications (for example, the development of drug delivery systems, tissue engineering constructs, and biosensors). In addition, such systems permit the determination of the effects of cell-cell and cell-material interactions which could potentially provide a means of guiding cellular behavior. Although, the ability to create internally complex three-dimensional materials on rigid substrates has been investigated, the ability to do the same within preformed hydrogels has only recently been examined. For example, West and co-workers have demonstrated that uniform and freeform 3D patterns could be created within preformed poly(ethylene glycol)-diacrylate (PEGDA) hydrogels via single-photon absorption (SPA) and two-photon absorption (TPA) photolithography. Unfortunately, radical polymerization of diacrylated and/or dimethyacrylated PEG results in heterogeneous crosslinked networks making it difficult to accurately predict and manipulate the physical and mechanical properties of the material.

Accordingly, there is a need for methods for producing hydrogels with relative control of the physical and chemical properties of the material.

SUMMARY OF THE INVENTION

Some aspects of the present invention provide a method for producing a hydrogel. Generally, methods of the invention comprise reacting a polymer comprising two or more azide functional groups with an oligopeptide comprising an acetylenic functional group under conditions sufficient to produce a [3+2] cycloaddition reaction between the azide functional group and the acetylenic functional group. In some embodiments, the polymer comprises poly(ethylene glycol) (PEG), poly(ethylene oxide) (PEO), poly(vinyl alcohol) (PVA), poly(vinylpyrrolidone) (PVP), poly(ethyloxazoline) (PEOX), poly(amino acids), polysaccharides, proteins, or a combination thereof. Within these embodiments, in some instances the polymer is poly(ethylene glycol). Typically, the average number molecular weight of the polymer used is at least about 2,000 g/mol, often at least about 4,000 g/mol, more often at least about 6,000 g/mol, and still more often at least about 8,000 g/mol. In other embodiments, the average number molecular weight of the polymer ranges from about 2,000 g/mol to about 100,000 g/mol, typically from about 4,000 g/mol to about 50,000 g/mol, and often from about 5,000 g/mol to about 30,000 g/mol.

Some oligopeptides comprise acetylenic functional group that does not require a catalyst to react with the azides. One of the advantages of not requiring a catalyst, in particular metal catalysts such as copper, is that the resulting hydrogels do not require removal of cytotoxic metals. Absence of any cytotoxic material (either by removal of the catalyst that is used in polymerization or by using a sufficiently reactive acetylenic group that does not require a catalyst) permits the encapsulation of live cells.

In some embodiments, the oligopeptide comprises from about 2 to 4 acetylenic functional groups. In other embodiments, the oligopeptide comprises from about 2 to about 50, typically from about 4 to about 30, and often from about 5 to about 20 amino acids, modified amino acids, or a combination thereof.

In other embodiments, the oligopeptide comprises an optionally substituted cyclic alkyne. Within these embodiments, in some instances the cyclic alkyne is a cyclooctyne. In other instances, the cyclic alkyne comprises cyclooctyne, halogenated cyclooctyne, or a combination thereof. Within these instances, in some cases the cyclic alkyne comprises 1-fluorocyclooct-2-ynyl, 2,2-difluorocyclooct-3-ynyl, or a combination thereof. In one particular embodiment, the oligopeptide is of the formula:

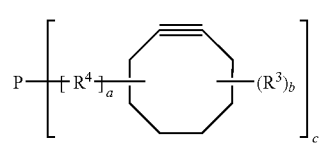

where
a is 0 or 1;
b is an integer from 0 to 4;
c is an integer from 1 to 2;
each $R^3$ is independently halide, alkyl, heteroalkyl, cycloalkyl, heterocycloalkyl, aryl, and heteroaryl; and
$R^4$ is a linker having from about 2 to about 100 atoms; and
P is an oligopeptide optionally substituted with one or more polymerizable functional groups.

Within this particular embodiment, in some instances $R^3$ is halide. In some cases, $R^3$ is fluoro.

In some instances, b of Formula I is 1 or 2.

Yet in other embodiments, the oligopeptide is an enzymatically responsive oligopeptide.

Still in other embodiments, the oligopeptide further comprises at least one covalently bonded polymerizable functional group. Within these embodiments, in some cases the polymerizable functional group comprises an olefinic moiety, an acetylinic moiety, an acrylate moiety, norborene, a methacrylate moiety, or a combination thereof.

In other embodiments, methods of the invention further comprises the steps of patterning the hydrogel. Such patterning can yield a three-dimensional biochemical and/or biomechanical patterning of hydrogels that can be used for a variety of application, e.g., for guiding cell behavior, etc. Furthermore, methods of the invention result in hydrogels with a well-defined network with greater mechanical strength than conventional methods. Well-defined network or structure of hydrogels of the present invention is due in part to the ability to use a photolithography process. In general, the step of patterning the hydrogel comprises:

contacting the hydrogel with a precursor mixture comprising a photoinitiator and a thio compound comprising a thiol functional group under conditions sufficient to diffuse the precursor mixture into the hydrogel;

forming a desired pattern within the hydrogel by a photolithography process to produce a patterned hydrogel; and removing at least a portion of the unreacted precursor mixture from the patterned hydrogel.

In some embodiments, the thio compound is a fluorescently labeled thio compound. Such fluorescently labeled thio compound allows one to visualize the pattern and/or monitor the contents of the hydrogel, e.g., cell activity etc. In some cases, the fluorescently labeled thio compound is a fluorescently labeled oligopeptide comprising a cystine. In these cases, it is the thiol group that is present on the cystine that serves as the thio functional group that reacts with a photopolymerizable function group of the hydrogel. Such photopolymerization results in a well-defined network of patterns with greater mechanical strength. Using a fluorescent labeled thio compound results in a hydrogel with a fluorescently-labeled three-dimensional pattern.

Other aspects of the invention provide a fluorescently labeled patterned hydrogel produced by the process described herein. For example, in some aspects of the invention, the process comprises:

reacting a polymer comprising two or more azide functional groups with an oligopeptide comprising an acetylenic functional group and at least one photopolymerizable functional group under conditions sufficient to produce a [3+2] cycloaddition reaction between the azide functional group and the acetylenic functional group to form a hydrogel;

contacting the hydrogel with a precursor mixture comprising a photoinitiator and a fluorescently labeled oligopeptide comprising a thiol functional group under conditions sufficient to diffuse the precursor mixture into the hydrogel;

forming a desired pattern within the hydrogel by a photolithography process to produce a fluorescently labeled patterned hydrogel.

Some embodiments include removing at least a portion of the unreacted precursor mixture from the patterned hydrogel.

DETAILED DESCRIPTION OF THE INVENTION

Definitions

Figure 1:
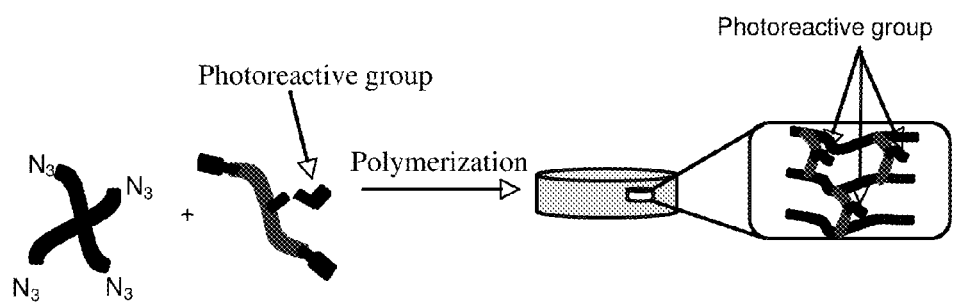
FIG. 1 is a schematic illustration of one embodiment of the invention for producing a hydrogel.

"Alkyl" refers to a saturated linear monovalent hydrocarbon moiety of one to twelve, often one to six, carbon atoms or a saturated branched monovalent hydrocarbon moiety of three to twelve, typically three to six, carbon atoms. Exemplary alkyl group include, but are not limited to, methyl, ethyl, n-propyl, 2-propyl, tent-butyl, pentyl, and the like.

"Aryl" refers to a monovalent mono-, bi- or tricyclic aromatic hydrocarbon moiety of 6 to 15 ring atoms which is optionally substituted with one or more, often one, two, or three substituents within the ring structure. When two or more substituents are present in an aryl group, each substituent is independently selected.

"Cycloalkyl" refers to a non-aromatic, often saturated, monovalent mono- or bicyclic hydrocarbon moiety of three to ten ring carbons. The cycloalkyl can be optionally substituted with one or more, often one, two, or three, substituents within the ring structure. When two or more substituents are present in a cycloalkyl group, each substituent is independently selected.

The terms "halo," "halogen" and "halide" are used interchangeably herein and refer to fluoro, chloro, bromo, or iodo.

As used herein, the term "heteroalkyl" means a branched or unbranched, acyclic alkyl moiety containing carbon, hydrogen and one or more heteroatoms in place of a carbon atom.

The term "heteroaryl" means a monovalent monocyclic or bicyclic aromatic moiety of 5 to 12 ring atoms containing one, two, or three ring heteroatoms selected from N, O, or S, the remaining ring atoms being C. The heteroaryl ring is optionally substituted independently with one or more substituents, often one or two substituents. Exemplary heteroaryls include, but is not limited to, pyridyl, furanyl, thiophenyl, thiazolyl, isothiazolyl, triazolyl, imidazolyl, isoxazolyl, pyrrolyl, pyrazolyl, pyrimidinyl, benzofuranyl, isobenzofuranyl, benzothiazolyl, benzoisothiazolyl, benzotriazolyl, indolyl, isoindolyl, benzoxazolyl, quinolyl, isoquinolyl, benzimidazolyl, benzisoxazolyl, benzothiophenyl, dibenzofuran, and benzodiazepin-2-one-5-yl, and the like.

"Heterocycloalkyl" means a non-aromatic monocyclic moiety of three to eight ring atoms in which one or two ring atoms are heteroatoms selected from N, O, or $S(O)_n$ (where n is an integer from 0 to 2), the remaining ring atoms being C, where one or two C atoms can optionally be a carbonyl group. The heterocyclyl ring can be optionally substituted independently with one or more, often one, two, or three, substituents. When two or more substituents are present in a heterocycloalkyl group, each substituent is independently selected.

The terms "oligopeptides," "oligopeptide", "peptides," and "peptide" are used interchangeably herein and include oligomers comprising amino acids, modified amino acids, linkers (e.g., a chain of hydrocarbon moieties), and a combinations thereof. Typically, an oligopeptide comprises from about 2 to about 50 amino acids, often from about 4 to about 40 amino acids, and more often from about 5 to about 10 amino acids. Unless indicated otherwise, amino acid sequences are written left to right in the direction from the amino to the carboxy terminus. In accordance with standard nomenclature, amino acid residue sequences are denominated by either a three letter or a single letter code as indicated as follows: Alanine (Ala, A), Arginine (Arg, R), Asparagine (Asn, N), Aspartic Acid (Asp, D), Cysteine (Cys, C), Glutamine (Gln, Q), Glutamic Acid (Glu, E), Glycine (Gly, G), Histidine (His, H, Isoleucine (Ile, I), Leucine (Leu, L), Lysine (Lys, K), Methionine (Met, M), Phenylalanine (Phe, F), Proline (Pro, P), Serine (Ser, S), Threonine (Thr, T), Tryptophan (Trp, W), Tyrosine (Tyr, Y), and Valine (Val, V).

"Variant" refers to an oligopeptide that differs from a reference oligopeptide, but retains essential properties. A typical variant of an oligopeptide differs in amino acid sequence from another, reference oligopeptide. Generally, differences are limited so that the sequences of the reference oligopeptide and the variant are closely similar overall and, in many regions, identical. A variant and reference oligopeptide may differ in amino acid sequence by one or more modifications (e.g., substitutions, additions, and/or deletions).

Modifications and changes can be made in the structure of the oligopeptides and still obtain a molecule having similar characteristics as the oligopeptide (e.g., a conservative amino acid substitution). For example, certain amino acids can be substituted for other amino acids in a sequence without appreciable loss of activity. Because it is the interactive capacity and nature of an oligopeptide that defines that oligopeptide's physical or biological functional activity, certain amino acid sequence substitutions can be made in an oligopeptide sequence and nevertheless obtain an oligopeptide with like properties.

In making such changes, the hydropathic index, and other physical properties of amino acids can be considered. The importance of the hydropathic amino acid index in conferring interactive biologic function on an oligopeptide is generally understood in the art. It is known that certain amino acids can be substituted for other amino acids having a similar hydropathic index or score and still result in an oligopeptide with similar biological activity. Each amino acid has been assigned a hydropathic index on the basis of its hydrophobicity and charge characteristics. Those indices are: isoleucine (+4.5); valine (+4.2); leucine (+3.8); phenylalanine (+2.8); cysteine/cysteine (+2.5); methionine (+1.9); alanine (+1.8); glycine (−0.4); threonine (−0.7); serine (−0.8); tryptophan (−0.9); tyrosine (−1.3); proline (−1.6); histidine (−3.2); glutamate (−3.5); glutamine (−3.5); aspartate (−3.5); asparagine (−3.5); lysine (−3.9); and arginine (−4.5).

It is believed that the relative hydropathic character of the amino acid determines the secondary structure of the resultant oligopeptide, which in turn defines the interaction of the oligopeptide with other molecules, such as enzymes, substrates, receptors, antibodies, antigens, and the like. It is known in the art that an amino acid can be substituted by another amino acid having a similar hydropathic index and still obtain a functionally equivalent oligopeptide. Typically, the substitution of amino acids whose hydropathic indices are within ±2 is used, often those within ±1 are used, and more often those within ±0.5 are used.

In some instances, substitution of like amino acids can also be made on the basis of hydrophilicity. The following hydrophilicity values have been assigned to amino acid residues: arginine (+3.0); lysine (+3.0); aspartate (+3.0±1); glutamate (+3.0±1); serine (+0.3); asparagine (+0.2); glutamine (+0.2); glycine (0); proline (−0.5±1); threonine (−0.4); alanine (−0.5); histidine (−0.5); cysteine (−1.0); methionine (−1.3); valine (−1.5); leucine (−1.8); isoleucine (−1.8); tyrosine (−2.3); phenylalanine (−2.5); tryptophan (−3.4). It is understood that an amino acid can be substituted for another having a similar hydrophilicity value and still obtain a biologically equivalent, e.g., an immunologically equivalent oligopeptide. In such changes, typically the substitution of amino acids whose hydrophilicity values are within ±2 is used, often those within ±1 are used, and more often those within ±0.5 are used.

In other instances, amino acid substitutions are generally based on the relative similarity of the amino acid side-chain substituents, for example, their hydrophobicity, hydrophilicity, charge, size, and the like. Exemplary substitutions that take various of the foregoing characteristics into consideration are well known to those of skill in the art and include (original residue: exemplary substitution): (Ala: Gly, Ser), (Arg: Lys), (Asn: Gln, His), (Asp: Glu, Cys, Ser), (Gln: Asn), (Glu: Asp), (Gly: Ala), (His: Asn, Gln), (He: Leu, Val), (Leu: Ile, Val), (Lys: Mg), (Met: Leu, Tyr), (Ser: Thr), (Thr: Ser), (Tip: Tyr), (Tyr: Trp, Phe), and (Val: He, Leu). The scope of the invention thus includes functional or biological equivalents of an oligopeptide as set forth herein. In particular, embodiments of the oligopeptides can include variants having about 50%, 60%, 70%, 80%, 90%, and 95% sequence identity to the oligopeptide of interest.

"Identity," as known in the art, is a relationship between two or more peptide sequences, as determined by comparing the sequences. In the art, "identity" also means the degree of sequence relatedness between peptide as determined by the match between strings of such sequences. "Identity" and "similarity" can be readily calculated by known methods, including, but not limited to, those described in *Computational Molecular Biology*, Lesk A. M., Ed., Oxford University Press, New York, 1988; *Biocomputing: Informatics and Genome Projects*, Smith, D. W., Ed., Academic Press, New York, 1993; *Computer Analysis of Sequence Data, Part I*, Griffin, A. M, and Griffin, H. G., Eds., Humana Press, New Jersey, 1994; *Sequence Analysis in Molecular Biology*, von Heinje, G., Academic Press, 1987; and *Sequence Analysis Primer*, Gribskov, M and Devereux, J., Eds., M Stockton Press, New York, 1991; and Carillo, H, and Lipman, D., *SIAM J Applied Math.*, 1988, 48, 1073.

Typically methods to determine identity are designed to give the largest match between the sequences tested. Methods to determine identity and similarity are codified in publicly available computer programs. The percent identity between two sequences can be determined by using analysis software (e.g., Sequence Analysis Software Package of the Genetics Computer Group, Madison Wis.) that incorporates the Needelman and Wunsch, (*J. Mol. Biol.*, 1970, 48, 443-453) algorithm (e.g., NBLAST, and XBLAST).

By way of example, a peptide sequence may be identical to the reference sequence, that is be 100% identical, or it may include up to a certain integer number of amino acid alterations as compared to the reference sequence such that the % identity is less than 100%. Such alterations are selected from: at least one amino acid modification (e.g., of the side-chain), deletion, substitution, including conservative and non-conservative substitution, or insertion, and wherein said alterations may occur at the amino- or carboxy-terminal positions of the reference oligopeptide sequence or anywhere between those terminal positions, interspersed either individually among the amino acids in the reference sequence or in one or more contiguous groups within the reference sequence. The number of amino acid alterations for a given % identity is determined by multiplying the total number of amino acids in the reference peptide by the numerical percent of the respective percent identity (divided by 100) and then subtracting that product from said total number of amino acids in the reference peptide.

As used herein, the term "treating", "contacting" or "reacting," when referring to chemical reaction, refers to adding or mixing two or more reagents under appropriate conditions to produce the indicated and/or the desired product. It should be appreciated that the reaction which produces the indicated and/or the desired product may not necessarily result directly from the combination of reagents which were initially added, i.e., there may be one or more intermediates which are produced in the mixture which ultimately leads to the formation of the indicated and/or the desired product.

Overview

In some aspects, the invention provides hydrogels and methods for using and producing the same. In some embodiments, the invention provides methods for patterning hydrogels. In some instances, methods of the invention are used for a three-dimensional biochemical and biomechanical patterning of hydrogels. Such patterned hydrogels have various applications, which are well known to one skilled in the art. For example, the patterned hydrogels can be used for guiding cell behavior and biomedical applications including, for example, the development of drug delivery systems, tissue engineering constructs, and biosensors. Other uses include controlling cell-cell interactions, cell-material interactions, guiding cellular differentiation. In addition, patterned hydrogels can be used for guiding cell migration which has implications in tissue development, homeostasis, embryological morphogenesis, inflammation, tissue repair, angiogenesis and immune surveillance.

Various methods are known for hydrogel production. However, in most conventional methods for producing hydrogels, it is difficult to predict and manipulate the physical and mechanical properties of the material.

In some embodiments, the invention provides methods for producing hydrogels with relative control of the physical and chemical properties of the material.

In some aspects the invention, methods for producing hydrogels are provided. In some embodiments within these aspects of the invention, methods utilize what is generally known as a [3+2] cycloaddition reaction or the "Click Chemistry" between an azide compound and an acetylenic compound. As used herein, the term "azide compound" refers to a compound comprising an azide functional group that undergoes a [3+2] cycloaddition with an acetylenic compound to produce a hydrogel. In some embodiments of the invention, the azide compound is a multiarm poly(ethylene glycol) comprising an azide functional group. Within these embodiments, in some instances the azide compound comprises a plurality of azide functional group.

The term "acetylenic compound" refers to a compound comprising a carbon-carbon triple bond that undergoes a [3+2] cycloaddition with an azide compound to produce a hydrogel. In some embodiments of the invention, the acetylenic compound comprises an enzyme responsive peptide. Within these embodiments, in some cases the acetylenic compound comprises at least one photoreactive functional group. In other cases, the acetylenic compound comprises at least one terminal acetylenic functional group.

In some embodiments, patterning of the hydrogel comprises photolithography. In some cases, methods of the invention provide three-dimensional patterning of hydrogels. Photolithography can be accomplished with any conventional methods and devices known to one skilled in the art. In some embodiments, photolithography is accomplished using two-photon absorption photolithography (TPA). By tightly focusing the excitation beam, the region of TPA can be confined to a focal volume roughly half the excitation wavelength in dimension. Any subsequent process, such as a photoinitiated or radical-based polymerization, is also localized to this small volume, assuming the timescale of radical diffusion to be large compared to the radical half-life. Thus, by specifying the location of the laser-beam focal point, regions of photo induced conjugation can be controlled.

Some embodiments of the invention provide biochemical and biomechanical patterning of hydrogels, e.g., for guiding cell behavior. In some instances, as illustrated in FIG. 1, methods of the invention utilize [3+2] cycloaddition reaction between the azide compound (e.g., multiarm poly(ethylene glycol) modified with azido groups) and the acetylenic compound (e.g., enzyme responsive peptides comprising acetylene functional groups and optionally photoreactive functional groups) for hydrogel formation.

Figure 2:
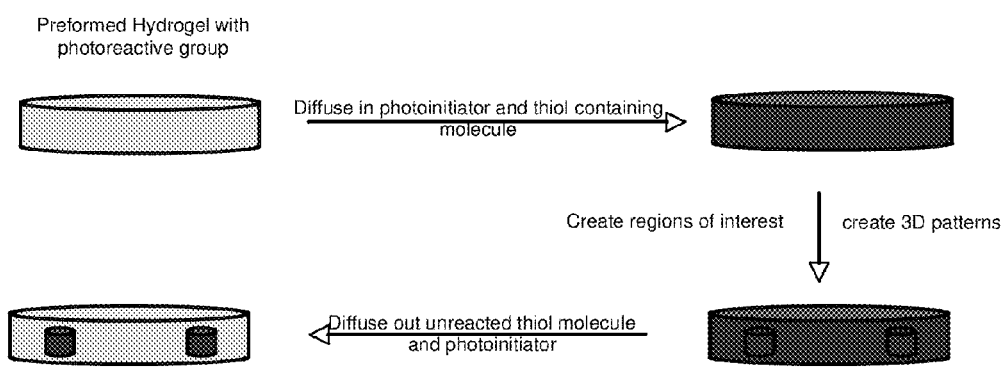
FIG. 2 is a schematic illustration of one embodiment of the invention for photolithographic patterning of a hydrogel.

FIG. 2 illustrates one particular embodiment for TPA photolithographic patterning of hydrogels. As shown in FIG. 2, a precursor solution of fluorescently labeled peptides comprising a free cystine and a UV photoinitiator is diffused into the hydrogel, which is then positioned on the stage of a laser scanning microscope (LSM). Virtual masks can be created, for example, by drawing regions of interest (ROIs) onscreen using standard LSM software. These virtual masks are converted into irradiation instructions that dictate in 3D the pixel locations at which the laser shutter is opened. An irradiation cycle is then initiated in which the focal point of a mode-locked Ti:sapphire laser scans across the user defined ROIs at the user-specified intensity and exposure times. By scanning specific regions within each focal plane and then incrementing focal planes, spatially complex 3D pattern is generated within existing hydrogel networks.

Without being bound by any theory, it is believed that methods of the invention provide hydrogels formed via a step-growth mechanism and results in a well-defined network with greater mechanical strength. Furthermore, in some embodiments incorporation of photo-reactive functional groups (e.g., allyl ether/ester groups, norbornenes, acrylates, methacrylates, etc.) within the peptide crosslink permits control over placement of biochemical gradients. In addition, incorporation of enzymatically responsive (i.e., enzymatically degradable) peptide crosslinks allows one to tailor the degradation profile for specific applications.

Azide Compound

In some aspects, methods of the invention utilize [3+2] cycloaddition reaction between an azide compound and an acetylenic compound for hydrogel formation. In some embodiments, the azide compounds comprise a linker. Typically, the linker is a chain comprising a non-repeating hydrocarbon moiety, a homopolymer, or a copolymer. A linker can be a straight chain, branched chain, cyclic structure, or a combination thereof. Cyclic structure can be aromatic, non-aromatic or a combination thereof. The term "non-repeating hydrocarbon moiety" refers to a linker with no repeating monomers. The term "homopolymer" refers to a linker having repeating units of a single monomer. The term "copolymer" refers to a linker having two or more different monomers that are covalently attached. Copolymer may or may not have repeating subunits. For example, the overall copolymer structure may or may not be comprised of repeating subunits, or it can be comprised of repeating subunits of only a portion of the monomers.

Exemplary linkers for azide compounds that are suitable for methods of the invention include poly(ethylene glycol), and any multi-armed (≥3) polymer or polypeptide. The linker generally comprises at least one azide functional group. Often the linker comprises at least two, more often at least three azide functional groups. However, it should be appreciated that the number of azide functional groups attached to the linker is not limited to these particular amounts and examples given herein. The number of azide functional groups can vary in order to affect the desired mechanical, chemical, and/or physical property of the resulting hydrogel. For example, the azide compound can comprise six, seven, eight or higher number of azide functional groups.

Figure 3:
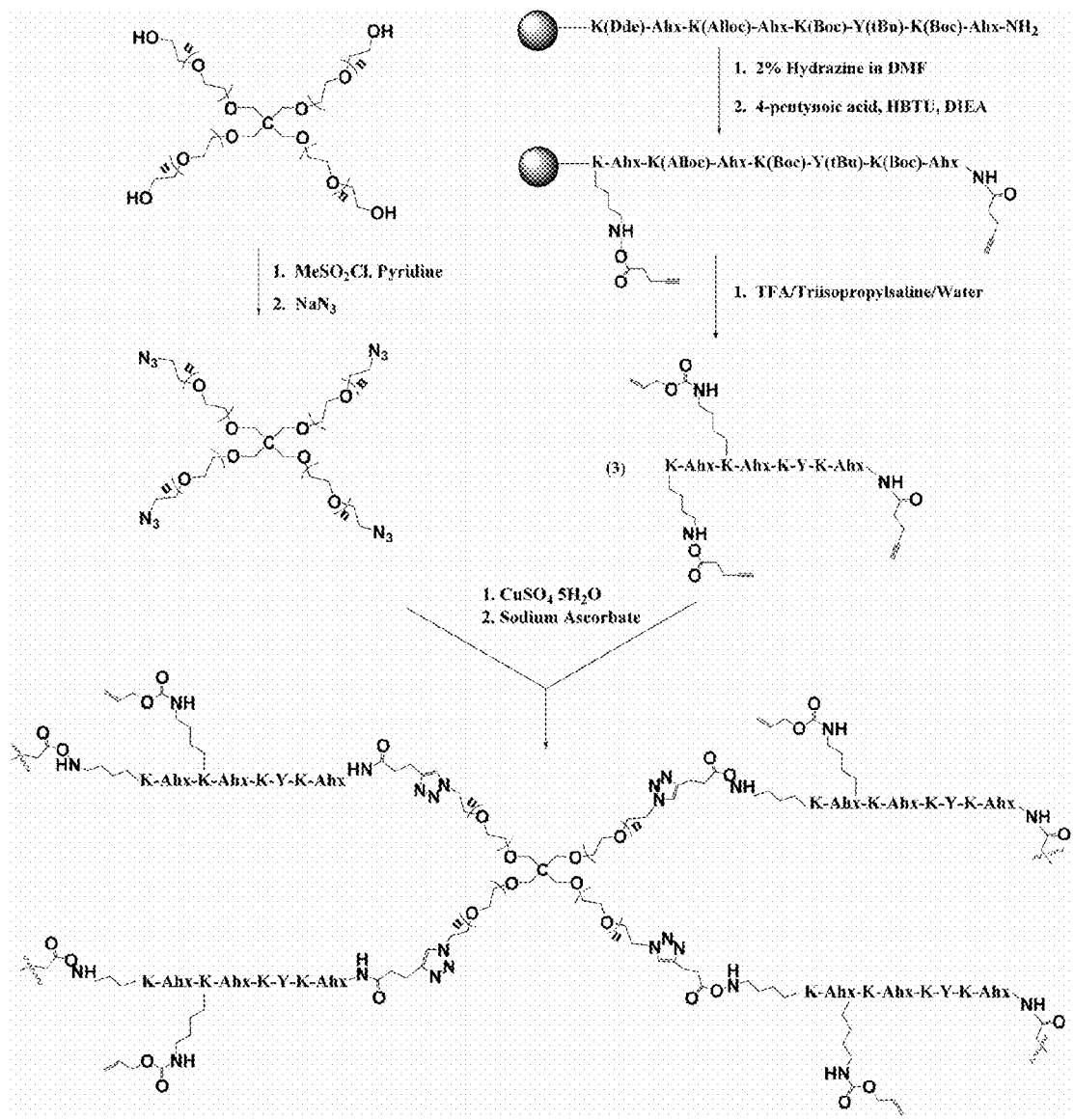
FIG. 3 is an illustration of one embodiment of the invention of modular approach for the synthesis of performed hydrogels via the [3+2] cycloaddition reaction.

In one particular embodiment of the invention, the azide compound is poly(ethylene glycol) modified with at least one, often two, more often three, and typically four azide functional groups. Such azide compounds can be readily prepared, for example, by reacting the corresponding alcohol group with mesyl chloride and displacing the resulting mesylate group with an azide group. One particular embodiment for preparing such an azide compound having poly(ethylene glycol), i.e., PEG, linker is illustrated in FIG. 3.

Acetylenic Compound

Typically, acetylenic compounds comprise a linker. Often the linker is a chain comprising a non-repeating hydrocarbon moiety, a homopolymer, or a copolymer. Exemplary linkers for acetylenic compounds that are suitable for methods of the invention include, but are not limited to, peptides, nucleotides, and poly(ethylene glycol). The linker generally comprises at least one acetylenic (i.e., carbon-carbon triple bond) functional group. Often the linker comprises at least two, sometimes at least three acetylenic functional groups. However, it should be appreciated that the number of acetylenic functional groups attached to the linker is not limited to these particular amounts and examples given herein. The number of acetylenic functional groups can vary in order to affect the desired mechanical, chemical, and/or physical property of the resulting hydrogel. For example, the acetylenic compound can comprise four, five, six, seven, eight or higher number of acetylenic functional groups.

In one particular embodiment of the invention, the acetylenic compound comprises a peptide linker comprising at least two acetylenic functional groups. The acetylenic compound can optionally be substituted with a photoreactive functional group. Such acetylenic compounds can be readily prepared, for example, by solid phase synthesis as illustrated in FIG. 3. Thus, a peptide bound to a solid state is reacted with a carboxylic acid comprising an acetylenic functional group via Mitsunobu coupling to provide a peptide linker with two acetylenic moieties attached. Cleaving the solid phase with trifluoroacetic acid then provides the desired acetylenic compound, which can be used in hydrogel formation as shown in FIG. 3.

Other suitable carboxylic acids comprising an acetylenic functional group include carboxylic acids having a strained or reactive acetylenic functional group. As used herein, the term "reactive acetylenic functional group" refers to acetylene moieties that can undergo [3+2] cycloaddition with an azide compound in the absence of any metal catalyst. Typically, these reactive acetylenic compounds comprise a strained ring system such as a cyclooctyne. Accordingly, some aspects of the invention provide a method for producing hydrogels by polymerizing an azide compound with an acetylenic compound in the absence of any catalyst. Typically the acetylenic compound is a reactive or strained acetylenic compound.

In some embodiments of the invention, the cyclooctyne is of the formula:

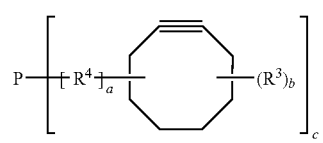

where
a is 0 or 1;
b is an integer from 0 to 4;
c is an integer from 1 to 2;
each $R^3$ is independently halide, alkyl, heteroalkyl, cycloalkyl, heterocycloalkyl, aryl, and heteroaryl; and
$R^4$ is a linker having from about 2 to about 100 atoms; and
P is an oligopeptide optionally substituted with one or more polymerizable functional groups.

Typically, $R^4$ comprises a carbonyl moiety. This allows $R^4$ to be linked to P by an ester or an amide linkage.

In some embodiments, P comprises one or more polymerizable functional groups. The presence of one or more polymerizable functional groups allows further manipulation of the hydrogel, for example, patterning, etc. Each polymerizable functional group is independently selected from the group consisting of an olefinic moiety, an acetylenic moiety, an acrylate moiety, norborene, and a methacrylate moiety.

In other embodiments, the peptide is responsive (i.e., reactive or degradable) to a variety of factors. For example, the peptide can be enzymatically or hydrolytically labile or photolabile.

Polymerization

Polymerization between an azide compound and an acetylenic compound of the invention provides a hydrogel. Typically, a [3+2] cycloaddition between an azide compound and an acetylenic compound requires the presence of a copper-catalyst. However, when the acetylenic compound is a reactive acetylenic compound, no metal catalyst is needed for [3+2] cycloaddition to occur.

Methods of the present invention provide hydrogels with a cross-linked network. In some instances methods of the invention facilitate the production of hydrogels with controlled architectures, improved mechanical strengths and the independent 3D tailoring of the material's chemical and physical properties.

Typical conditions for facilitating [3+2] cycloaddition polymerization between an azide compound and an acetylenic compound can be readily determined without undue experimentation by one skilled in the art having read the present disclosures including the Examples section below.

One particular embodiment of the invention is illustrated in FIG. 3, which shows hydrogel production using a tetraazide-multiarm PEG and diacetylene-functionalized allyl ester containing polypeptides. This provides well-defined photoreactive PEG-peptide composite hydrogels (PEGtides). As stated previously, the synthesis of tetraazide-functionalized PEG and the diacetylene-functionalized allyl ester polypeptides is also shown in FIG. 3.

Referring again to FIG. 3, activation of the hydroxyl groups on the multiarm PEG (10K) with mesyl chloride in methylene chloride (DCM) followed by nucleophilic substitution with sodium azide in dimethylformide (DMF) at 80° C.

produced the tetrazide in 90-95% overall yield. The on-resin synthesis of the photoreactive cross-linker was synthesized via standard solid-phase peptide synthesis using Fmoc protected amino acids and HBTU/HOBt coupling chemistry. The photo-reactive component was incorporated into the peptide via the use of the commercially available Fmoc-K(Alloc)-OH amino acid. The alloxycarbonyl contains a vinyl functional group and can undergo thiol-ene polymerization reactions. Also, the Alloc protecting group is stable to Fmoc deprotection and TFA cleavage, making it a good candidate as the photo-reactive component of PEGtide hydrogel. Incorporation of the diacetylene functionality was accomplished by placing Fmoc-Ahx-OH and Fmoc-K(Dde)-OH at the N- and C-termini, respectively. After the final Fmoc deprotection, the resin was treated with a solution of hydrazine monohydrate in DMF (this selectively removed the Dde protecting group) thus exposing two primary amines (one at both termini) that were subsequently reacted with a pre-activated solution of 4-pentynoic acid. Cleaving the peptide from the resin via treatment with TFA and purification via RP-HPLC produced the acetylenic compound in 60% overall yield.

Figure 4A:
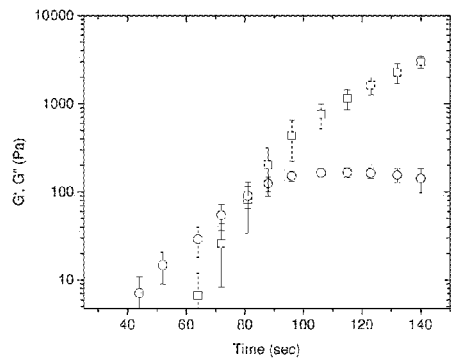
FIG. 4A is a graph of dynamic time sweep (300% strain, 100 rad/s) of a 13.5 wt % monomer solution in PBS pH 7.3 (G', □; G", ○).
Figure 4B:
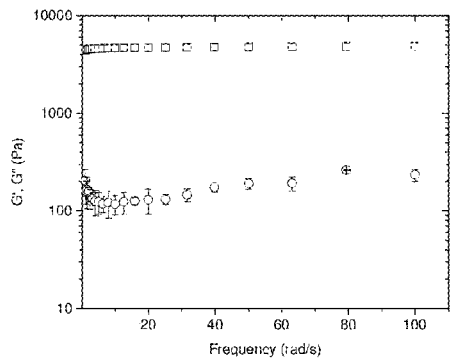
FIG. 4B is a graph of dynamic frequency sweep (10% strain) of hydrogels swelled in PBS pH 7.3 for 48 hours (G', □; G", ○).

Polymerization of the resulting azide compound and the acetylenic compound, see the Examples section for details, gave the hydrogel that was patterned via photolithography as discussed below. Briefly, hydrogel formation (13.5 wt %) was facilitated via reaction of the tetraazide, 2, with 2.0 equivalents of acetylenic compound 3 at room temperature with 0.5 equivalents of copper sulfate pentahydrate (no copper catalyst is used for cylooctynes) and 5.0 equivalents of sodium ascorbate. Under these conditions, hydrogels were formed within minutes as determined via dynamic time sweep rheology experiments. See FIG. 4A. After the initial gelation, hydrogels were treated with 0.1M EDTA in phosphate-buffered saline (PBS, pH 7.3), to remove the copper catalysts, followed by PBS (pH 7.3) to remove any excess EDTA. The final product was an optically transparent photoreactive cross-linked hydrogel. The swollen hydrogels were shown to retain their storage modulus as determined via dynamic frequency sweep rheology experiments. See FIG. 4B.

Patterning Hydrogels

By providing a polymerizable functional group within the hydrogels, the hydrogels of the invention can be patterned by a variety of methods known to one skilled in the art. Often the polymerizable functional group comprises a functional group that can be polymerized under a free radical condition.

In some embodiments, the polymerizable functional group is an olefin (or an "ene" group). Within these embodiments, in some cases the polymerization or patterning of the hydrogel can be achieved by a thiol-ene photopolymerization reaction. Typical thiol-ene photopolymerization reaction is based on the radical catalyzed addition of a thiol to an olefin (or vinyl) functional group. These systems have several advantages over (meth)acrylate-based polymerizations. For example, thiol-ene polymers form in a stepwise manner via a rapid and efficient free-radical chain-transfer reaction. As such, cross-linking by thiol-ene polymerizations proceed relatively rapidly but do not typically reach the gel point until very high conversion (i.e., polymerization) is achieved. This reduces the concentration of unreacted precursor in the resulting cross-linked network relative to, for example, acrylate or methacrylates-based polymerizations that are conventionally used. Also, thiol-ene-based systems are typically not inhibited by oxygen and have also been shown to be less toxic than the frequently used acrylate formulations.

In one particular embodiment, the ability to tailor the 3D microenvironment within the PEGtide hydrogels was demonstrated via reaction of the Alloc moiety (tethered to the diacetylene-peptide crosslink) and a fluorescently-labeled cystine containing peptide (Alexa Fluor 488-AhxRGDSC, see the Example Section for details) thiol-ene photopolymerization using a photolithographic method. Briefly, photomasks were prepared via mounting patterned transparencies (Estey Printing, Boulder, Colo.) onto glass slides (1 mm). Hydrogel substrates were fabricated into thin films (25 mm$^2$) by polymerizing the monomer solution between a glass microscope slide and a cover slip. The copper catalysts and ascorbic acid were removed with EDTA and PBS prior to patterning. The gels were then mounted onto a movable platform and placed in a Hybralign 200 mask alignment system (OAI, Milpitas, Calif.) with a 3 in. diameter UV-light source (Oriel Instruments, Stratford, Conn.). The platform was lowered to allow room for the precursor solution (this solution contained the cystine-containing fluorescently-labeled peptide and a photoinitiator (1% I2959)). After the precursor solution was added, the photomask was placed over the movable platform and securely fastened. Then the platform was raised until the precursor solution forms a thin film in between the photomask and the preformed hydrogel. When exposed to collimated UV-light (365 nm, 40 mW/cm2), the peptide in sections where the mask is transparent react with the Alloc group within each peptide crosslink, forming a thiol ether linkage. The mask was removed and excess material, i.e. non-cured precursor, was removed by washing with PBS (pH 7.3).

Figure 5A:
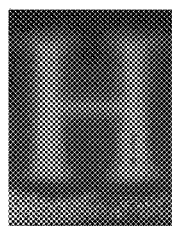
FIG. 5A is a fluorescent pattern formed within existing hydrogel network via transparency-based photolithographic patterning.
Figure 5B:
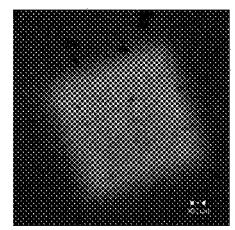
FIG. 5B is a confocal image of a hydrogel patterned with fluorescently labeled RGDSC.

FIGS. 5A and 5B demonstrates representative two-dimensional patterns created on PEGtide hydrogels via thiol-ene polymerization and transparency-based photolithography. Closer inspection of the figures reveals that the feature sizes of the photomasks were preserved during the patterning process.

Figure 5C:
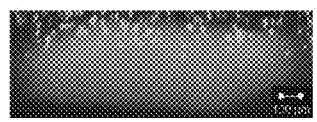
FIG. 5C is an image z-stacks of hydrogel (270 μm thick) of FIG. 5B that were acquired at 10 μm intervals and then projected into single plane image along with fluorescent noise that is the attributed to dust on the cover slip.

Analysis of FIG. 5B with ImageJ image analysis software (NIH, Bethesda, Md.) revealed the average dimension of the photo-patterned square to be approximately 1052.60±50 μm, compared to the photomask which had an absolute dimension of 1000 μm. Furthermore, inspection of FIG. 5C reveals that three-dimensional patterns of uniform cross section that span the thickness of the hydrogel can also be easily generated via this approach. The z-dimension (thickness) of the three-dimensional hydrogel was determined via ImageJ to be approximately 231.50±15 μm. These results clearly showed the validity of the methods of the invention in producing tailorable cross-linked networks within hydrogels.

Figure 6:
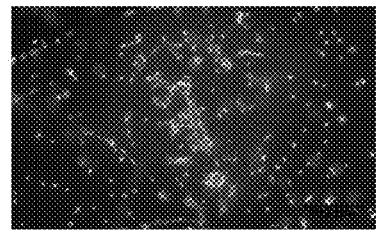
FIG. 6 is a fluorescence image of hMSCs seeded on the surfaces of a hydrogel patterned according to a method of the invention with fluorescently labeled RGDSC at day 5.

The ability to pattern three-dimensional biochemical gradients within hydrogel networks permits directed cell migration which is known to be important in processes such as tissue development, inflammation, wound healing, and angiogenesis. The ability of hydrogels of the invention to direct cellular adhesion and spreading is demonstrated as follows: human mesenchymal stem cells (hMSCs) were seeded onto the surface of PEGtide hydrogels patterned with the fluorescently-labeled AhxRGDSC peptide (shown in FIGS. 5B and 5C). After 5 days in culture, the degree of hMSC spreading was evaluated via LIVE DEAD assay (Molecular Probes) and imaged using standard fluorescence microscopy as shown in FIG. 6, which clearly shows that cells seeded within the RGDS patterned region (dark green region within the dotted white lines) have extended processes and are actively spreading throughout the patterned region; whereas those cells outside the patterned region are not. These results confirm that the incorporation of biochemical patterns via thiol-ene polymerization within hydrogels can dictate cellular function.

Additional objects, advantages, and novel features of this invention will become apparent to those skilled in the art upon examination of the following examples thereof, which are not intended to be limiting.

EXAMPLES

Materials and Methods

Mulitarm poly(ethylene glycol) (PEG) was purchased from Nektar Therapeutics (Hunington, Ala.). Fmoc amino acids, MBHA amide resins, 2-(1H-benzotriazole-1-yl)-1,1,3,3-tetramethyluronium hexafluorophosphate (HBTU), and 1-hydroxybenzotriazole (HOBT) were purchased from Novabiochem. Alexa Fluor 488 TFP was purchased from Molecular Probes. All other reagents were purchased from Sigma Aldrich unless otherwise noted. HPLC solvents consisted of solvent A (0.1% TFA in water) and solvent B (0.1% TFA in acetonitrile). All solvents used were anhydrous grade (unless otherwise noted) and all glassware was thoroughly dried before use.

Synthesis of Compound 1 (PEG-Tetramesylate)

10 kD multi-arm poly(ethylene glycol) (2.0 g, 0.8 mmol OH groups) was dissolved in a mixture of dry pyridine/dicholormethane (15:5) under argon via an additional funnel. This solution was then cooled to 0° C. To this cooled solution, mesyl chloride (308 μl, 4 mmol) dissolved in minimal dichloromethane (5 mL) was added dropwise over the course of 5 min. The reaction was allowed to warm to room temperature overnight with constant stirring under argon atmosphere. The solution was concentrated and washed with a saturated solution of sodium bicarbonate and dried with magnesium sulfate. The organic layer was then precipitated via treatment with diethyl ether. The activated intermediate was precipitated twice in diethyl ether, filtered, and dried before further use. $^1$H NMR (DMSO $d_6$): 4.32 (8H, m, 4×MsOCH$_2$), 3.68 (8H, m, 4×MsOCH$_2$ CH$_2$), 3.47-3.57 (880H, m, [CH$_2$CH$_2$O]$_n$), 3.19 (12H, s, 4×CH$_3$SO$_2$O—).

Synthesis of Compound 2 (PEG-Tetraazide)

A mixture of compound 1 (0.83 g, 0.32 mmol CH$_3$SO$_2$O—) and sodium azide (0.1 g, 1.6 mmol) in dry DMF (10 mL) was stirred under argon at 80° C. for 24 hrs. The solid salts were removed via filtration through Celite, and the filtrate was concentrated via evaporation. The polymer was recovered via precipitation with diethyl ether and filtration. The precipitate was then dissolved in distilled water and dialyzed against water for 2 days. The dialyzed solution was then freeze-dried to yield the desired product. $^1$H NMR (CDCl$_3$): 3.50-3.77 (896H, m, CH$_2$[CH$_2$CH$_2$O]$_n$CH$_2$), 3.40 (8H, m, 4×CH$_2$N$_3$).

Synthesis of Compound 3 (Peptide Cross-Linker)

The acetylene containing photoreactive peptide Ahx-K-Y-K-Ahx-K(Alloc)-Ahx-K(Dde)-CONH$_2$ was synthesized on an ABI 433A peptide synthesizer (Foster City, Calif.) via standard solid-phase peptide synthesis methodology using Fmoc-protected amino acids with appropriate side-chain protecting groups, Rink amide MBHA resin, and HBTU/HOBT activation. After the synthesis was completed the resin was treated with 2% hydrazine in DMF to remove the Dde group from the C-terminal lysine (3×, 10 min). Then the resin was treated with a solution of HATU/DIPEA/4-pentynoic acid. This step was repeated until no free amines were present as determined via ninhydrin test. Then the peptide was cleaved with concomitant side chain deprotection using trifluoroacetic acid/triisopropylsilane/water (95:2.5:2.5) and precipitated into ice cold diethyl ether to yield the crude peptide. The crude peptide was then dissolved in water and purified by RP-HPLC on a Symmetry C18 peptide/protein preparative column using a linear gradient of 5% to 70% B over 49 minutes. MALDI-TOF-MS was used to access the identity and purity of the peptide using an α-cyano-4-hydroxycinnamic acid (CHCA) maxtix: calculated (M+H)$^+$=1278.02; observed: 1278.20.

Alexa Fluor 488-Ahx-RGDSC (AF488-Peptide) Synthesis

The fluorescently labeled peptide AF488-NH-Ahx-R-G-D-S-C-CONH2 was synthesized in a manner similar to that described above. However, after the final Fmoc deprotection the resin was treated with the pre-activated fluorophore Alexa Fluor 488 TFP (0.5 mg/0.125 mmol of peptide) in NMP. The reaction was allowed to proceed at room temperature for 2 hours. Then the resin was washed with DCM and dried in a vacuum oven overnight. Peptide cleavage, deprotection, and purification were performed as described above. MALDI-TOF-MS: calculated (M+H)$^+$=1194.47, observed: (M+H)$^+$=649.98 (AhxRGDSC) and (M+H)$^+$=1278.38.

Hydrogel Synthesis

Hydrogel formation (13.5 wt %) by copper-catalyzed cycloaddition chemistry was carried out via treatment of the PEG-tetraazide, 2, with 2.0 equivalents of peptide diacetylene, 3, at room temperature under aqueous conditions in the presence of copper sulfate (0.5 equivalents) and sodium ascorbate (5.0 equivalents) as the reducing agent. Hydrogels formed within minutes. Hydrogels were then treated with 0.1 M aqueous ethylenediamine tetraacetic acid (EDTA) solution followed by phosphate-buffered saline (PBS, pH 7.3) to remove the copper catalysts.

Rheology Experiments

Dynamic frequency, time, and strain sweep rheology experiments were performed on a TA Ares rheometer with a 20 mm diameter parallel plate geometry at 25° C. Initial gel network formation of a 13.5 wt % solution (immediately after mixing in the copper catalyst) was monitored by observing G' and G" at a constant frequency of 100 rad/s as a function of time. Gel strength was monitored via frequency sweep measurements at fixed strain amplitude (10%) to measure the hydrogel storage, G', and loss, G", moduli. See FIGS. 4A and 4B 3D Patterning on Hydrogels Hydrogels formed via click chemistry were fabricated into thin 25 mm$^2$ thin films via standard techniques. The gels were then mounted in a custom built mask alignment system to allow the 3-D patterning of the gels. Briefly, the preformed hydrogel was first immobilized on a movable platform. The platform was lowered to allow room for the precursor solution (this solution contains the cystine-containing fluorescently-labeled peptide (6 mg/ml) and a photoinitiatior (1% I2959)). After the precursor solution is added, a photomask (mounted to a glass slide) is placed over the movable platform and securely fastened. Then the platform is raised until the precursor solution forms a thin film in between the photomask and the preformed hydrogel. When exposed to collimated UV-light (365 nm, 40 mW/cm2), the peptide in sections where the mask is transparent react with the allyl ester group within each peptide crosslink, forming a thiol ether linkage. The mask is removed and excess material, i.e. non-cured precursor, is removed by washing with PBS (pH 7.3). Patterned hydrogels were imaged using a Zeiss LSM 5 Pascal confocal microscope. Image z-stacks, 270 μm thick, were acquired at 10 μm intervals and then projected into single plane images.

Cell Studies hMSCs were purchased from Cambrex and cultured in growth medium: low-glucose Dulbecco's modified eagle medium supplemented with 10% FBS, 1% penicillin/streptomycin, 0.25% gentamicin, and 0.25% fungizone. hMSCs at passage 4 were used in this study.

Cell Patterning

The preformed RGDSC patterned hydrogels were sterilized via treatment with hMSC growth media and placed under UV light for 24 hours. hMSCs were then seeded on the hydrogel surface (50,000 cells/gel) and allowed to adhere for 24 hrs. Unbound cells were subsequently rinsed away and cell adhesion, localization, and morphology were examined via phase contrast and fluorescent microscopy at days 5 and 28.

Hydrogel Formation without Using a Catalyst and Uses Thereof

Figure 7:
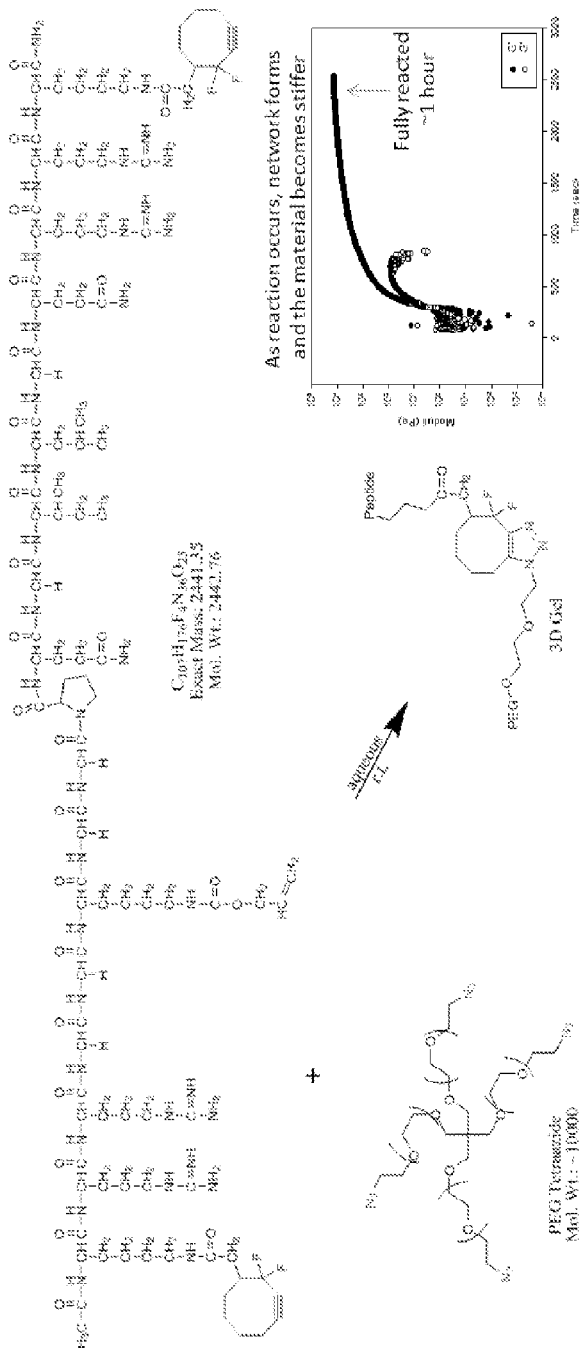
FIG. 7 shows one particular chemistry for producing a cytocompatible hydrogel between a difluorinated cyclooctyne and PEGTetraazide, and a graph showing the rate of reaction.
Figure 8:
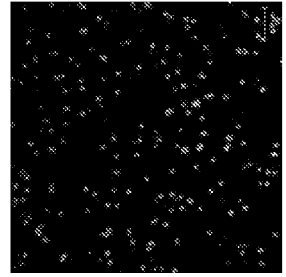
FIG. 8 shows a 200 micron projection fluorescent image through the z-plane of post encapsulation 3T3 fibroblasts cells 24 hours after encapsulation, where live cells are shown in green and dead cells are shown in red.

The difluorinated cyclooctyne moiety allowed for rapid gel formation (~5 min) without the need for a copper-catalyst. See FIG. 7. Since this process did not require a toxic catalyst, cells had a high survival rate through encapsulation using the resulting hydrogel. For example, post encapsulation of 3T3 fibroblasts cell viability was assessed using Molecular Probes' Live/Dead kit (FIG. 8, live cells shown in green, dead cells shown in red). The confocal microscopy image below represents a 200 micron projection through the z-plane taken 24 hours after encapsulation.

Figure 9:
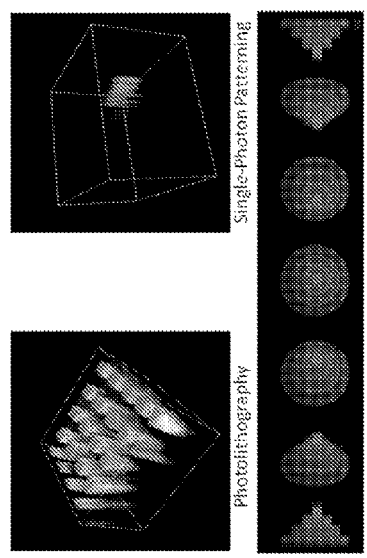
FIG. 9 is fluorescent images of hydrogels that have been patterned with fluorescently-labeled peptide adhesives using various photolithography techniques

The pendent allyl ester functionality allowed for biochemical and biomechanical patterning via the thiol-ene reaction in the presence of focused light. This was achieved using conventional photolithography, as well as single-photon and two-photon techniques. See FIG. 9. In FIG. 9, a fluorescently-labeled peptide adhesive ligand sequence was used to visualize patterning capabilities.

Figure 10:
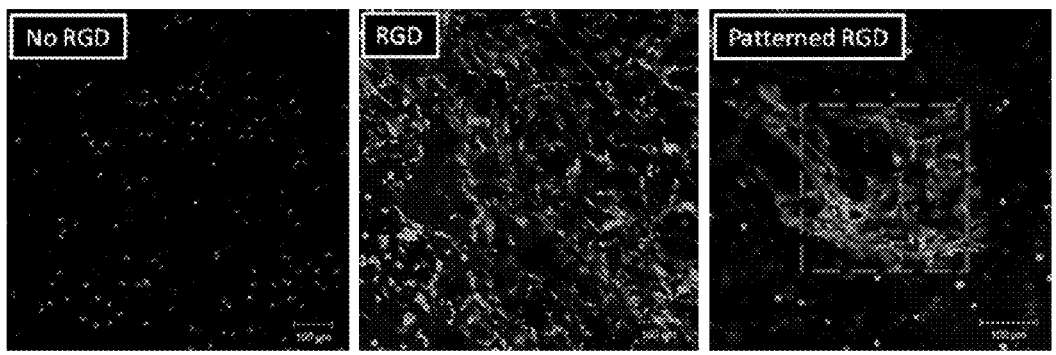
FIG. 10 is 200 micron confocal projection through the z-plane fluorescent images of live cells on day 10 in a patterned hydrogel that were produced by the [3+2] cycloaddition without any catalyst.

To assess the cytocompatible nature of the thiol-ene patterning, a peptide adhesive ligand sequence (RGD) known to direct cell attachment in 3D was locally patterned. As shown in FIG. 10, cells exhibited a spread morphology solely in regions of RGD. Cells were subsequently stained with Cell-Tracker® Orange to assess viability. Shown in FIG. 10 is a 200 micron confocal projection through the z-plane taken on day 10.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed:

1. A method for producing a hydrogel comprising:
reacting a polymer comprising two or more azide functional groups with an oligopeptide comprising at least one covalently bonded polymerizable functional group and an optionally substituted cyclic alkyne under conditions sufficient to produce a [3+2] cycloaddition reaction between the azide functional group and the acetylenic functional group to form a hydrogel, wherein said polymerizable functional group comprises an olefinic moiety, an acetylinic moiety, an acrylate moiety, norborene, a methacrylate moiety, or a combination thereof; and
patterning said hydrogel, wherein said step of patterning the hydrogel comprises:
contacting said hydrogel with a precursor mixture comprising a photoinitiator and a thio compound comprising a thiol functional group under conditions sufficient to diffuse the precursor mixture into the hydrogel;
forming a desired pattern within the hydrogel by a photolithography process to produce a patterned hydrogel; and
removing at least a portion of the unreacted precursor mixture from the patterned hydrogel.

2. The method of claim 1, wherein the thio compound is a fluorescently labeled thio compound.

3. The method of claim 2, wherein the fluorescently labeled thio compound is a fluorescently labeled oligopeptide comprising a cystine.

4. The method of claim 2, wherein the patterned hydrogel comprises a fluorescently-labeled three-dimensional pattern.

\* \* \* \* \*